United States Patent [19]
Menig

[11] Patent Number: 5,261,288
[45] Date of Patent: Nov. 16, 1993

[54] ENHANCED MISSED SHIFT FROM NEUTRAL RECOVERY FOR AUTOMATED OR SEMI-AUTOMATED MECHANICAL TRANSMISSION SYSTEM

[75] Inventor: Paul M. Menig, Portage, Mich.

[73] Assignee: Eaton Corporation, Cleveland, Ohio

[21] Appl. No.: 993,332

[22] Filed: Dec. 18, 1992

[51] Int. Cl.$^5$ .............................. F16H 5/46
[52] U.S. Cl. .................... 74/335; 74/336 R
[58] Field of Search ................ 74/336 R, 335

[56] References Cited

U.S. PATENT DOCUMENTS

| | | | |
|---|---|---|---|
| 4,361,060 | 11/1982 | Smyth | 74/866 |
| 4,690,008 | 9/1987 | Klatt | 74/336 R |
| 4,702,127 | 10/1987 | Cote | 74/335 X |
| 4,989,471 | 2/1991 | Bulgrien | 74/336 R |
| 5,053,961 | 10/1991 | Genise | 74/866 X |
| 5,053,962 | 10/1991 | Genise | 74/866 X |
| 5,063,511 | 11/1991 | Mack et al. | 74/866 X |
| 5,099,711 | 3/1992 | Langbo et al. | 74/336 R |

Primary Examiner—Leslie A. Braun
Assistant Examiner—Daniel Wittels
Attorney, Agent, or Firm—H. D. Gordon

[57] ABSTRACT

A control system (104) for controlling execution of selected upshifts and downshifts of a mechanical transmission system (10) is provided. The control system includes a central processing unit (106) for receiving input signals indicative of engine (11) and output shaft (90) speeds and from a driver control console (108) indicative of manual or automatic selection of upshifts or downshifts from a currently engaged gear ratio and processing the same in accordance with predetermined logic rule to issue command output signals to a transmission actuator (112, 70, 96) to implement the selected shifts upon a manual or automatic caused torque break of the transmission and manual or automatic substantial synchronization of the transmission thereafter. The predetermined logic rules include an algorithm providing enhanced recovery from a missed shift and stuck in neutral condition including rules for selecting a more easily engaged ratio ($GR_{MSR}$) in view of current engine speed ($ES_{CURRENT}$) and vehicle speed (OS).

3 Claims, 4 Drawing Sheets

ENHANCED MISSED SHIFT FROM NEUTRAL RECOVERY FOR AUTOMATED OR SEMI-AUTOMATED MECHANICAL TRANSMISSION SYSTEM

BACKGROUND OF THE INVENTION

1. Field of the Invention

This invention relates to vehicular semi-automatic mechanical transmission systems and, in particular, to semi-automatic mechanical transmission systems of the type providing partially automatic implementation of manually or automatically selected changes or shifting of mechanical transmission gear ratios.

More particularly, the present invention relates to a control system which enhances recovery from missed shifts in a semi-automatic shift implementation requiring the vehicle operator or system controller to create synchronous or substantially synchronous conditions for engagement of the transmission nonsynchronized jaw clutches.

2. Description of the Prior Art

Fully automatic transmission systems, both for heavy-duty vehicles such as heavy-duty trucks, and for automobiles, that sense throttle openings or positions, vehicle speeds, engine speeds, and the like, and automatically shift the vehicle transmission in accordance therewith, are well known in the prior art. Such fully automatic change gear transmission systems include automated transmissions wherein pressurized fluid is utilized to frictionally engage one or more members to other members or to a ground to achieve a selected gear ratio as well as automated mechanical transmission utilizing electronic and/or pneumatic logic and actuators to engage and disengage mechanical (i.e. positive) clutches to achieve a desired gear ratio. Examples of such transmissions may be seen by reference to U.S. Pat. Nos. 3,961,546; 4,081,065 and 4,361,060, the disclosures of which are hereby incorporated by reference.

Such fully automatic change gear transmissions can be unacceptably expensive, particularly for the largest heavy-duty vehicles which are not typically sold in high volumes. Additionally, those automatic change gear transmissions utilizing pressurized fluid and/or torque converters tend to be relatively inefficient in terms of power dissipated between the input and output shafts thereof.

Semi-automatic transmission systems utilizing electronic control units which sense throttle position, engine, input shaft, output shaft and/or vehicle speed, and utilize automatically controlled fuel throttle devices, gear shifting devices and/or master clutch operating devices to substantially fully automatically implement operator manually selected transmission ratio changes are known in the prior art. Examples of such semi-automatic transmission systems may be seen by reference to U.S. Pat. Nos. 4,425,620; 4,631,679 and 4,648,290, the disclosures of which are incorporated herein by reference.

While such semi-automatic mechanical transmission systems are very well received as they are somewhat less expensive than fully automatic transmission systems, allow manual clutch control for low speed operation and/or do not require automatic selection of the operating gear ratio, they may be too expensive for certain applications as a relatively large number of sensors and automatically controllable actuators, such as a master clutch and/or a fuel throttle device actuator, are required to be provided, installed and maintained.

Semi-automatic shift implementation systems/methods for mechanical transmission systems for use in vehicles having a manually only controlled engine throttle means, and a manually only controlled master clutch, have been proposed. Such systems may be seen by reference to U.S. Pat. Nos. 5,053,959; 5,053,961; and 5,053,962, the disclosures of which are incorporated herein by reference.

These systems may include a control/display panel or console for operator selection of upshifts, downshifts or shifts into neutral, an electronic control unit (ECU) for receiving input signals indicative of transmission input and output shaft speeds and of manually selected shifts and for processing same in accordance with predetermined logic rules to issue command output signals and a transmission actuator for shifting the transmission in accordance with the command output signals. The control/display device will allow the operator to select/preselect a shift into a higher ratio, a lower ratio or into neutral and will display the selected but not yet implemented shift as well as the current status of the transmission.

A concern with such automated and semi-automated systems, especially semi-automatic mechanical transmission system requiring an operator to manually bring the transmission within an acceptable range of synchronous conditions before the control allows or commands engagement of a target gear ratio, is that the ranges are set at relatively small bands, to increase shift quality, which may result in the operator missing the band and becoming stuck in neutral, which is usually very understandable.

According to the control of U.S. Pat. No. 5,063,511, the disclosure of which is incorporated herein by reference, if the selected shift is not implemented within a given period of time, the control logic will assume that the operator has missed the shift and will increase the bands or ranges to allow for a harsher shift which enhances the probability that the operator's efforts will result in implementation of the selected shift.

While the missed shift recovery system/method of above-mentioned U.S. Pat. No. 5,063,551 does considerably enhance the probability of recovering from a missed shift from neutral into a desirable target ratio, a shift into the selected desirable target ratio may remain unaccomplished.

SUMMARY OF THE INVENTION

In accordance with the present invention, a missed shift recovery method/system is provided which will provide an alternative for and/or a supplement to the missed shift recovery system/method of above-mentioned U.S. Pat. No. 5,063,551.

According to the missed shift recovery system/method of the present invention, if a shift from neutral into a desirable target ratio is not implemented within a given period of time as a result of a failure to achieve substantially synchronous conditions, the system control will determine a missed shift recovery target ratio, as a function of current engine and vehicle speed, and will then attempt to implement engagement of that ratio.

As is known, in a heavy duty multiple speed mechanical transmission having 9, 10, 12, 13, 16 19 or 20 selectable forward gear ratios (GR), for many vehicle operating conditions, 3, 4 or 5 ratios are permissibly engageable (i.e. at current vehicle speed, usually determined by output shaft speed (OS), and at master clutch lockup, the calculated engine speed (ES=GR*OS) will be above a minimum value ($ES_{MIN}$) and below a maximum value ($ES_{MAX}$).) The minimum value ($ES_{MIN}$) is usually about the stall speed of the engine while the maximum value ($ES_{MAX}$) is slightly below a destructive speed. Engines usually have a desirable speed or range of speeds wherein a predetermined combination of performance and fuel economy is obtained. For a typical heavy duty diesel engine, the minimum speed is usually about 600 RPM, the maximum speed is about 2200 RPM and the desirable range is about 1400–1800 RPM.

While the desirable target ratio is usually selected to maintain the engine speed in the desirable range at a given vehicle speed, the missed shift recovery target ratio ($GR_{MSR}$) is selected so that the calculated engine speed at current vehicle speed and master clutch lockup ($ES_{CALC}=OS_{CURRENT}*GR_{MSR}$) will be within the range of allowable engine speeds ($ES_{MIN}<ES_{CALC}<ES_{MAX}$) and will minimize the absolute value of the expression $ES_{CURRENT}-ES_{CALC}$.

By attempting to engage the missed shift recovery target gear ratio $GR_{MSR}$ rather than the desirable target ratio $GR_D$, especially if the expanded ranges of synchronous conditions described in above-mentioned U.S. Pat. No. 5,063,511 are utilized, will greatly enhance the probability of shifting from neutral into an allowable ratio in situations wherein obtaining synchronous conditions for shifting into a selected desirable target gear ratio has not occurred. While a somewhat undesirable ratio may be engaged and/or a significant lurch of the vehicle may occur, the highly undesirable condition of being stuck in neutral will be more rapidly and predictably corrected.

This and other objects and advantages of the present invention will become apparent from a reading of the detailed description of the preferred embodiment taken in connection with the attached drawings.

BRIEF DESCRIPTION OF THE DRAWINGS

FIGS. 4–4A are schematic illustrations, in flow chart format, of the present invention.

DESCRIPTION OF THE PREFERRED EMBODIMENT

Figure 1:
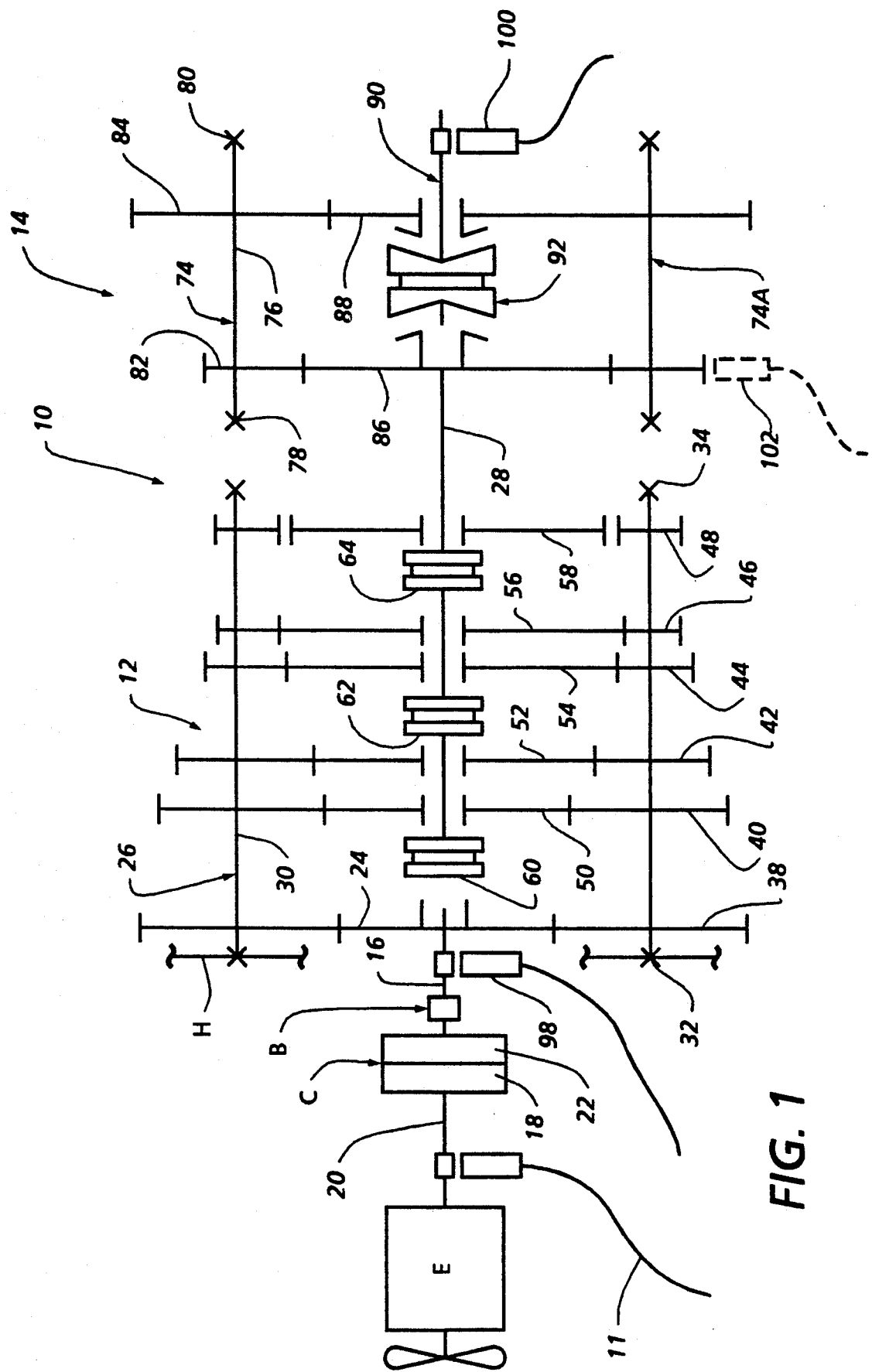
FIG. 1 is a schematic illustration of the vehicular mechanical transmission system partially automated by the system of the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

Referring to FIG. 1, a range type compound transmission 10 of the type partially automated by the semi-automatic mechanical transmission system of the present invention is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled by a manually or automatically controlled throttle device (not shown) and master clutch C is manually controlled by a clutch pedal (not shown) or automatically controlled by a clutch actuator, or the like. An input shaft brake B, usually operated by the clutch pedal, is preferably provided to provide quicker upshifting as is well known in the prior art.

Transmissions similar to mechanical transmission 10 are well known in the prior art and may be appreciated by reference to U.S. Pat. Nos. 3,105,395; 3,283,613 and 4,754,665, the disclosures of which are incorporated by reference. A sensor 11 is provided for sensing the rotational speed of the engine and providing a signal indicative thereof.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known acting nonsynchronized double acting jaw clutch type.

Shift housing or actuator 70 may be actuated by compressed fluid, such as compressed air, and is of the type automatically controllable by a control unit as may be seen by reference to U.S. Pat. Nos. 4,445,393; 4,555,959; 4,361,060; 4,722,237 and 2,931,237, the disclosures of which are incorporated by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith. Similar transmissions provide 10, 13, 16 or 18 forward speeds as may be seen by reference to U.S. Pat. Nos. 4,754,665 and 4,974,468.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of a shift fork (not shown) and the range section shifting actuator assembly 96, is provided for clutching either gear 86 to mainshaft 28 for low range operation or gear 88 to mainshaft 28 for direct or high range operation of the compound transmission 10.

Range section actuator 96 may be of the type illustrated in U.S. Pat. Nos. 3,648,546; 4,440,037 and 4,614,126, the disclosures of which are hereby incorporated by reference.

Although the range type auxiliary section 14 is illustrated as a two-speed section utilizing spur or helical type gearing, it is understood that the present invention is also applicable to range type transmission utilizing combined splitter/range type auxiliary sections, having three or more selectable range ratios and/or utilizing planetary type gearing. Also, may one or more of clutches 60, 62 or 64 may be of the synchronization jaw clutch type and transmission sections 12 and/or 14 may be of the single countershift type.

For purposes of providing semi-automatic shift implementation operation of transmission 10, an input shaft speed sensor and an output shaft speed sensor 100 are utilized. Alternatively to output shaft speed sensor 100, a sensor 102 for sensing the rotational speed of auxiliary section countershaft gear 82 may be utilized. The rotational speed of gear 82 is, of course, a known function of the rotational speed of mainshaft 28 and, if clutch 92 is engaged in a known position, a function of the rotational speed of output shaft 90.

Figure 2:
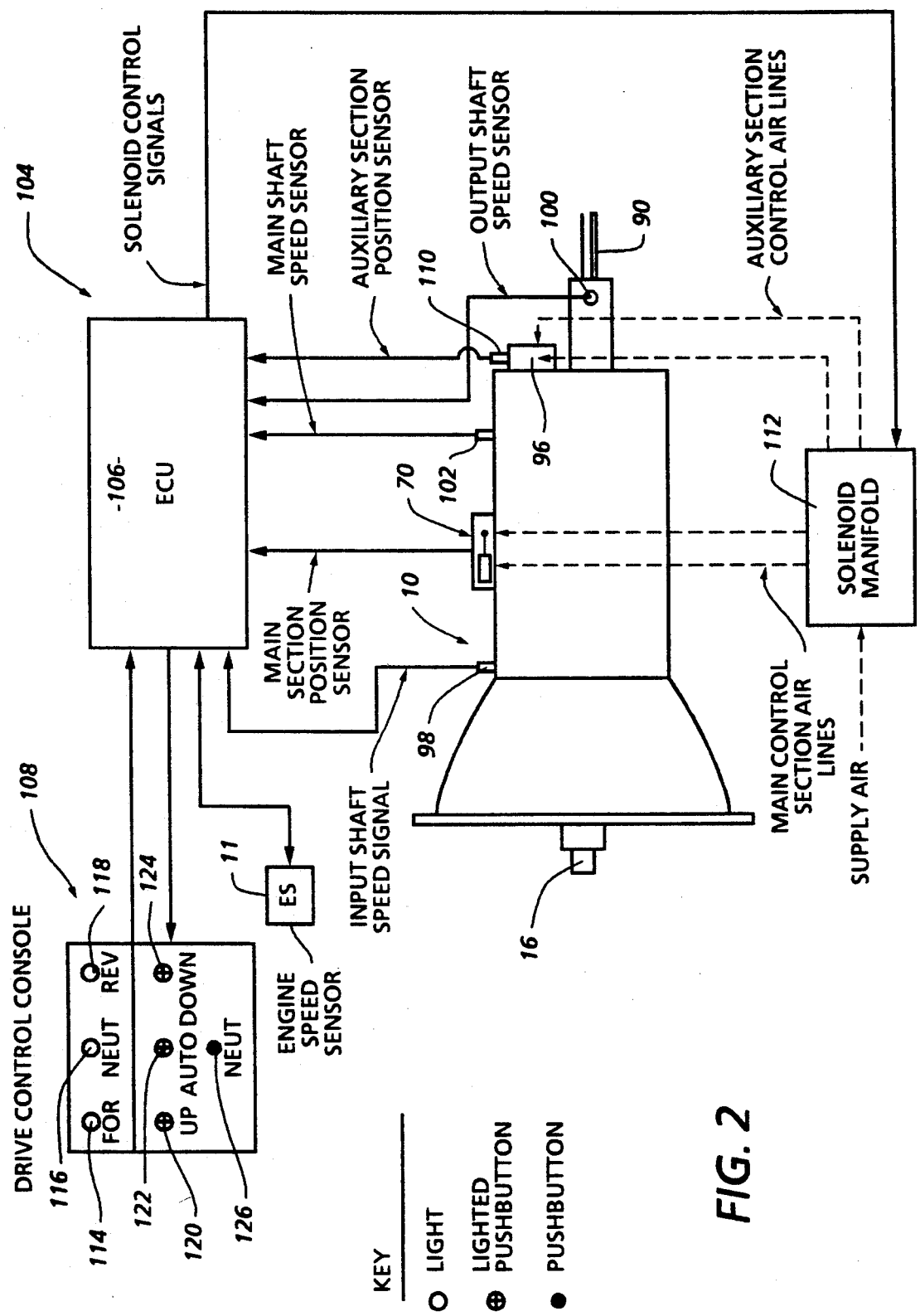
FIG. 2 is a schematic illustration of the semi-automatic shift implementation system for a mechanical transmission system of the present invention.

The semi-automatic shift implementation control system 104 for a mechanical transmission system of the present invention is schematically illustrated in FIG. 2. Control system 104, in addition to the mechanical transmission system 10 described above, includes an electronic control unit 106, preferably microprocessor based, for receiving input signals from the engine speed sensor 11, input shaft speed sensor 98, from the output shaft speed sensor 100 (or, alternatively, the mainshaft speed sensor 102) and from the driver control console 108. The ECU 106 may also receive inputs from an auxiliary section position sensor 110.

The ECU is effective to process the inputs in accordance with predetermined logic rules to issue command output signals to a transmission operator, such as solenoid manifold 112 which controls the mainsection section actuator 70 and the auxiliary section actuator 96, and to the driver control console 108.

The driver control console allows the operator to manually select a shift in a given direction or to neutral from the currently engaged ratio, or to select a semiautomatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neurtal.

A selection made by depressing or pushing any one of buttons 120, 122, 124 or 126 and may be cancelled (prior to execution in the case of buttons 120, 124 and 126) by redepressing the buttons. As an alternative, multiple depressions of buttons 120 and 124 may be used as commands for skip shifts. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

In operation, to select upshifts and downshifts manually, the operator will depress either button 120 or button 124 as appropriate. The selected button will then be lighted until the selected shift is implemented or until the selection is cancelled.

Alternatively, at a given engine speed (such as above 1700 RPM) the upshift button may be lit and remain lit until an upshift is selected by pushing the button.

To implement a selected shift, the manifold 112 is preselected to cause actuator 70 to be biased to shift main transmission section 12 into neutral. This is accomplished by the operator causing a torque reversal by manually momentarily decreasing and/or increasing the supply of fuel to the engine and/or manually disengaging the master clutch C. As the transmission is shifted into neutral, and neutral is verified by the ECU (neutral sensed for a period of time such as 1.5 seconds), the neutral condition indicia button 116 is lighted. If the selected shift is a compound shift, i.e. a shift of both the main section 12 and of the range section 14, such as a shift from 4th to 5th speeds as seen in FIG. 1A, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged, which will result in an acceptably synchronous engagement of the ratio to be engaged. As the operator, or a control unit, by throttle manipulation and/or use of the input shaft brake, causes the input shaft speed to fall within the acceptable range, the ECU 106 will issue command output signals to manifold 112 to cause actuator 70 to engage the mainsection ratio to be engaged. Preferably, the actuator will respond very quickly not requiring the operator to maintain the input shaft speed within the acceptable range for an extended period of time. To select a shift into transmission neutral, selection button 126 is pushed. Indicating light 116 will flash until the ECU confirms that neutral is obtained at which time the light 116 will assume a continuously lighted condition while the transmission remains in neutral.

In the control algorithms, the issuing of command output signals for engagement of a target gear is dependent upon the transmission (i.e. the input shaft) being manually brought to within an acceptable synchronous point. This synchronous point is usually a range of RPMs (error band) centered about an error of zero RPM. When the control electronics sense that the input shaft speed falls within the error band it will fire the solenoid of manifold 112 that will cause the target gear to be engaged. The error bands are selected to give the best shift quality for each gear ratio. These error bands are usually stored in software in the form of tables that are indexed as a function of target gear. When these tables are set up for best shift quality the bands must be made small to minimize "clunking" as the target gear is engaged. With small error bands it is more difficult for the driver to bring the transmission to the correct synchronous point and he may miss it altogether and end up in neutral.

Above-mentioned U.S. Pat. No. 5,063,511 provided a missed shift recovery algorithm that will access a second set of tables a short time after neutral has been sensed (one second). In a normal shift, one second is ample time for the driver to have brought the transmission to the synchronous point. If the neutral state has existed for more than the allowed time the algorithms will assume the driver has missed the shift and call for the new set of tables. This second set of tables will open the error bands to allow for a harsher shift which enhances the probability that the driver's efforts will result in engagement of the target gear instead of remaining in a neutral state.

By way of example, in the mainsection 12 of transmission 10, shifts between 1st and 2nd speeds and 2nd and 3rd speeds are manually acceptable at ±40 RPM, while shifts between 3rd and 4th speeds are normally acceptable at ±80 RPM, from true synchronous. However, in the enhanced missed shift recovery mode, of above-mentioned U.S. Pat. No. 5,063,511, the comparable ranges are expanded to, ±60 RPM and ±100 RPM, respectively.

In the automatic preselection mode of operation, selected by use of lighted pushbutton 122, the ECU will, based upon stored logic rules, currently engaged ratio (which may be calculated by comparing input shaft to output shaft speed) and output shaft speed, determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash and/or an audible shift alert signal. The operator may initiate semi-automatic implementation of the automatically preselected shift as indicated above or may cancel the automatic mode by depression of pushbutton 122.

According to the present invention, a missed shift recovery method/system is provided which will provide an alternative for and/or a supplement to the missed shift recovery system/method of above-mentioned U.S. Pat. No. 5,063,551.

According to the missed shift recovery system/method of the present invention, if a shift from neutral into a desirable target ratio is not implemented within a given period of time as a result of a failure to achieve substantially synchronous conditions, the system control will determine a missed shift recovery target ratio, as a function of current engine and vehicle speed, and will then attempt to implement engagement of that ratio. The period of time may be measured from an initial attempt to engage the desirable target ratio, or may occur only after the missed shift recovery method/system of above-mentioned U.S. Pat. No. 5,063,557 has been unsuccessfully attempted.

As is very well known, in a heavy duty multiple speed mechanical transmission having 9, 10, 12, 13, 16 19 or 20 selectable forward gear ratios (GR), for many vehicle operating conditions, 3, 4 or 5 of the ratios are permissibly engageable (i.e. at current vehicle speed, usually determined by output shaft speed (OS), and at master clutch (C) lockup, the calculated engine speed (ES=GR*OS) will be above a minimum value ($ES_{MIN}$) and below a maximum value ($ES_{MAX}$). The minimum value ($ES_{MIN}$) is usually about the stall speed of the engine while the maximum value ($ES_{MAX}$) is slightly below a destructive speed.

Internal combustion engines usually have a desirable speed or range of speeds wherein a predetermined combination of performance and fuel economy is obtained. For a typical vehicular heavy duty diesel engine, the minimum speed is usually about 600 RPM, the maximum speed is about 2200 RPM and the desirable range is about 1400–1800 RPM.

While the desirable target ratio is usually automatically or manually selected to maintain the engine speed in the desirable range at a given vehicle speed, the missed shift recovery target ratio ($GR_{MSR}$) is selected so that the calculated engine speed at current vehicle speed and master clutch lockup ($ES_{CALC} = OS_{CURRENT} * GR_{MSR}$) will be within the range of allowable engine speeds ($ES_{MIN} < ES_{CALC} < ES_{MAX}$) and will minimize the absolute value of the expression $ES_{CURRENT} - ES_{CALC}$.

Figure 3:
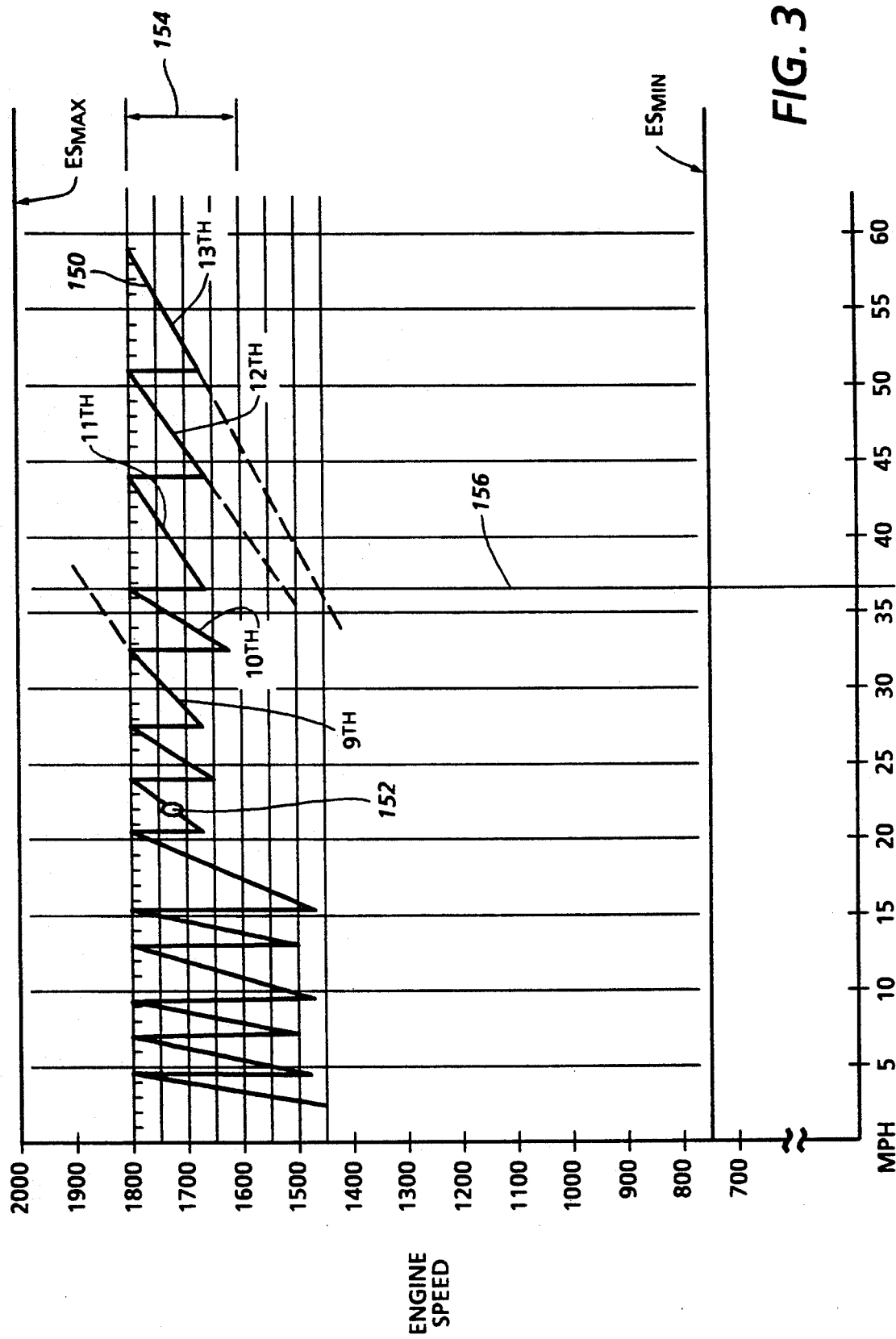
FIG. 3 is a schematic illustration of a preferred gear ratio of a thirteen speed transmission at various vehicle speeds for a given engine.

Referring to FIG. 3, a typical gear ratio chart for a thirteen (13) forward speed transmission is illustrated. The transmission used for illustrative purposes is a Model RTO 11613 from Eaton Corporation, assignee of the present invention, and has a low ratio of 12.56:1 and a high (overdrive) ratio of 0.87:1.

In FIG. 3, dark solid line 150 represents the desirable ratios at various vehicle ground speeds. For example, at point 152, about 23 MPH, a seventh (7th) speed should be engaged and as the speed increases toward 25 MPH, a new desirable target ratio ($GR_{DES}$) will be eight (8th) speed to maintain engine speed within a desirable performance/fuel economy band 154.

At about 37 MPH (line 156), assuming the vehicle has been accelerating, a shift from 10th speed into the desirable target ratio 11th speed may be manually and/or automatically selected or preselected. However, at this vehicle speed (37 MPH), 9th, 10th, 11th, 12th or 13th speed are allowably engageable as may be seen by reference to FIG. 3.

If substantially synchronous conditions for engagement of a desirable target ratio cannot be manually or automatically achieved, especially if the missed shift recovery system/method of above-mentioned U.S. Pat. No. 5,063,511 is attempted, by then attempting to engage the missed shift recovery target gear ratio $GR_{MSR}$, rather than the desirable target ratio $GR_D$, especially if the expanded ranges of synchronous conditions described in above-mentioned U.S. Pat. No. 5,063,511 are utilized, will greatly enhance the probability of shifting from neutral into an allowable ratio in situations wherein obtaining synchronous conditions for shifting into a selected desirable target gear ratio has not occurred. While a somewhat undesirable ratio may be engaged and/or a significant lurch of the vehicle may occur, the highly undesirable condition of being stuck in neutral will be more rapidly and probably corrected.

Figures 4A, 4B:
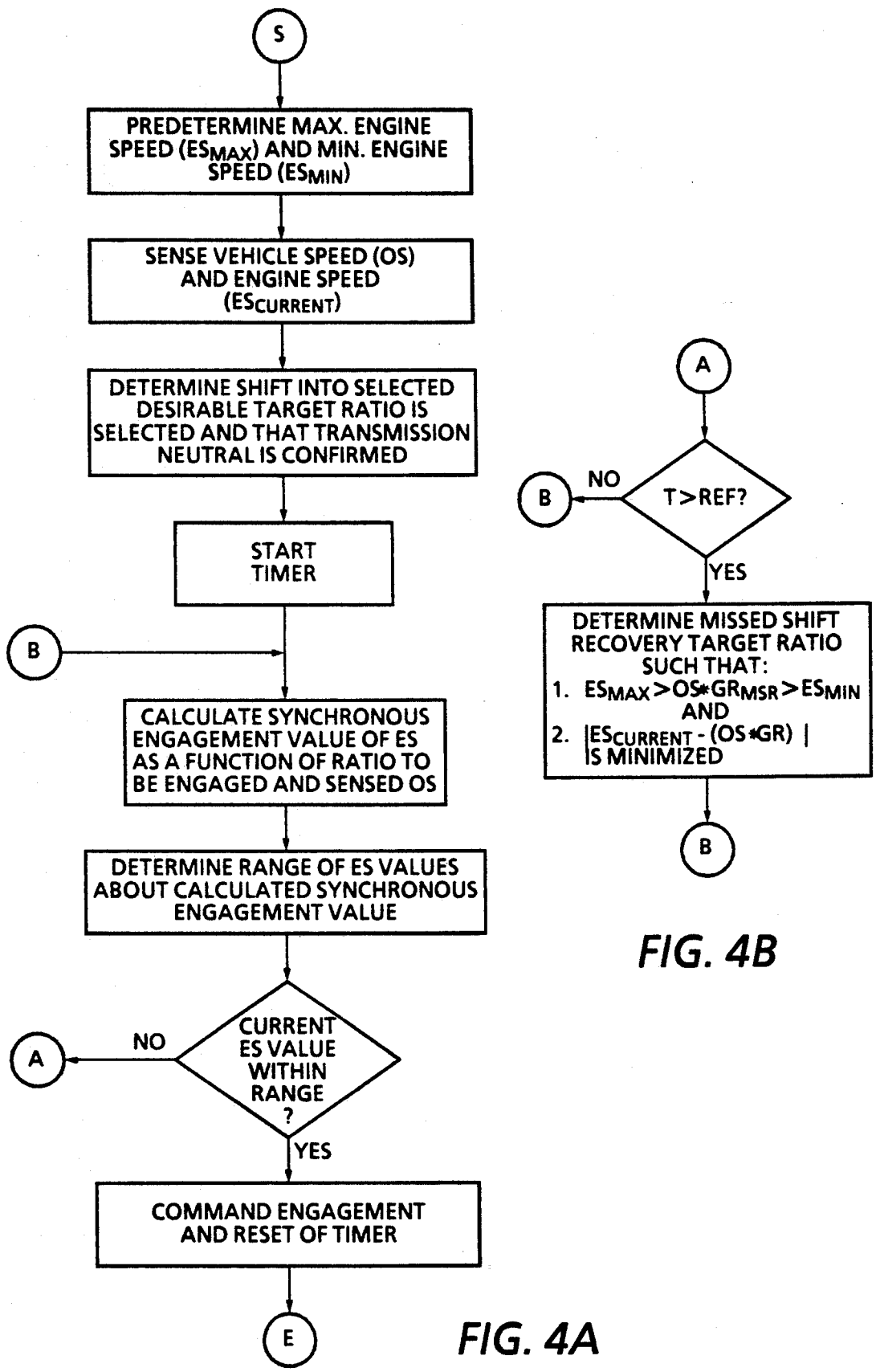

The missed shift recovery method/system of the present invention is schematically illustrated, in flowchart format, in FIGS. 4A and 4B.

Although the present invention has been described with a certain degree of particularity, it is understood that various changes to form and detail may be made without departing from the spirit and the scope of the invention as hereinafter claimed.

I claim:

1. A control system (104) controlling the implementation of selected shifts of a mechanical change gear transmission system comprising a fuel throttle controlled engine (E), having a predetermined minimum ($ES_{MIN}$) and maximum ($ES_{MAX}$) engine speed, a multi-speed change gear mechanical transmission (10), having a plurality of selectably engagable ratios a master friction clutch (C) drivingly interposed between the engine and the transmission, a first sensor (11) for providing a first input signal indicative of engine rotational speed, a second sensor (100) for providing a second input signal indicative of transmission output shaft rotational speed and a transmission actuator (112, 70, 96) for controlling shifting of the transmission, said control system characterized by;

means (120, 122, 124, 106) for selecting an upshift or a downshift from a currently engaged transmission ratio or from neutral to a selected target ratio (GR), and providing a third input signal indicative of said selection;

a central processing unit (106) for receiving said first, second and third input signals and for processing same in accordance with predetermined logic rules to issue command output signals, said central processing unit including;

means responsive to (i) a selection of a shift from a currently engaged ratio or from neutral into a selected target ratio and (ii) confirmation of a transmission neutral condition for (i) initiating the start up of a timing member, (ii) and thereafter sensing substantial synchronization of the transmission and (iii) thereafter for issuing command output signals to said actuator to enable the transmission to be shifted into the selected target ratio; said means sensing substantial synchronization of said transmission by comparing said first signal to a first reference range determined as a function of said selected target ratio and said second signal; and means responsive to (i) a selection of a shift from a currently engaged ratio or from neutral into a second ratio and (ii) confirmation of a transmission neutral condition for (i) initiating the start up of a timing member, (ii) and thereafter failing to sense substantial synchronization of the transmission after a predetermined period of time to (i) cause the selection of a missed shift recovery target ratio ($GR_{MSC}$) according to the following rules:

(a) $ES_{MAX} > OS * GR_{MSR} > ES_{MIN}$, and (b) 1 $ES_{CURRENT} - OS * GR_{MSR}$/is minimized, and (ii) for sensing manual substantial synchronization of the transmission and (iii) thereafter for issuing command output signals to said actuator to cause the transmission to be shifted into the selected ratio.

2. The system of claim 1 wherein said reference time period is at least one second.

3. The system of claims 1 or 2 wherein said range is a range of values of said first input signal having an average value substantially equal to the expected value of said first input signal when the jaw clutches of the selected ratio to be engaged are rotating at substantially synchronous speed.

* * * * *